No. 664,647. Patented Dec. 25, 1900.
H. KINNEY & J. O. HANKINS.
VEHICLE WHEEL.
(Application filed Apr. 5, 1900.)
(No Model.)
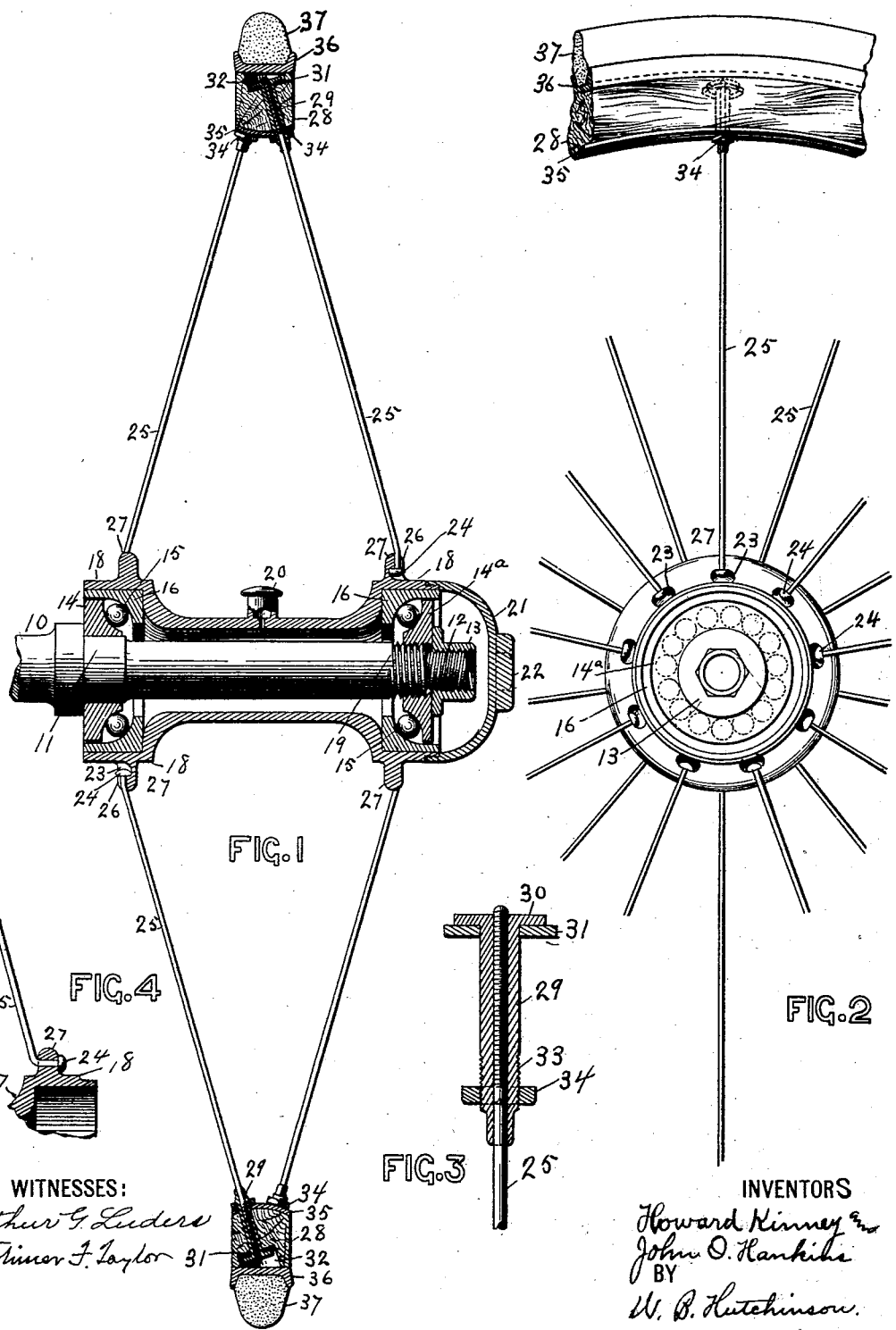
WITNESSES:
Arthur G. Lueders
Mortimer F. Taylor
INVENTORS
Howard Kinney
John O. Hankins
BY
W. B. Hutchinson.
ATTORNEY

UNITED STATES PATENT OFFICE.

HOWARD KINNEY, OF PASSAIC, NEW JERSEY, AND JOHN O. HANKINS, OF RICHMOND, VIRGINIA.

VEHICLE-WHEEL.

SPECIFICATION forming part of Letters Patent No. 664,647, dated December 25, 1900.

Application filed April 5, 1900. Serial No. 11,575. (No model.)

*To all whom it may concern:*

Be it known that we, HOWARD KINNEY, of Passaic, Passaic county, New Jersey, and JOHN O. HANKINS, of Richmond, Henrico county, Virginia, have invented certain new and useful Improvements in Vehicle-Wheels, of which the following is a full, clear, and exact description.

Our invention relates to improvements in vehicle-wheels; and one object of our invention is to produce a very cheap and simple wheel on the general lines of a bicycle-wheel which can be conveniently applied to an ordinary carriage-axle, which can also be used with a special axle, and which has its parts very light and strong and is easily adjustable, so as to keep all the parts tight and so free from rattling.

Another object of our invention is to produce a very cheap and simple means of applying a ball-bearing wheel to an ordinary straight axle.

To these ends our invention consists of certain features of construction and combination of parts, which will be hereinafter described and claimed.

Reference is had to the accompanying drawings, forming a part of this specification, in which similar characters of reference refer to similar parts throughout the several views.

Figure 1 is a cross-section of the wheel and hub, showing our improvements. Fig. 2 is a broken side elevation of the wheel with the cap of the hub removed. Fig. 3 is an enlarged detail section showing the means of connecting one of the wheel-spokes to the felly. Fig. 4 is a detailed sectional view showing a slightly-modified means of connecting the spokes to the hub.

In the drawings, 10 represents an ordinary carriage-axle, with customary shoulder 11, and the reduced and threaded end 12 to connect with a nut 13 of the kind generally employed to hold a wheel to the axle.

In carrying out our invention we first place upon the axle the cone 14, substantially like an ordinary ball-bearing cone, but fitting closely on the shoulder 11. It will be understood, however, that if an axle is made specially for the wheel it will be of a uniform diameter where it passes through the wheel.

On the cone ride the usual bearing-balls 15, which are retained between the cone and the cup 16, and the latter is pressed to place by the hub 17, which is smaller at the middle than at the ends, the latter being enlarged, as shown, at 18 to fit cups 16 at each end of the hub. The two cups 16 are similar; but the outer cone 14$^a$ differs from the cone 14 in that it is centrally screw-threaded, so that it may be screwed conveniently to the threaded part 19 of the axle.

We have shown the hub 17 provided with an ordinary oil-cup 20, so that it is self-oiling; but this feature is common to many wheel-hubs, and we do not claim it as new. To protect the wheel-hub from dust, the other end is provided with a cap 21, which screws to the outer end of the hub and which is provided with a squared nut 22 to enable it to be easily manipulated with a wrench.

The hub is provided near each end with an annular flange 27, which has sockets 23 to receive the heads 24 of the spokes 25. The flanges 27 are also preferably channeled from the sockets 24 to the edge of each flange, so that each spoke will lie in a channel, as shown clearly in Fig. 1, and thus two advantages are obtained—first, the pull of the spoke is practically straight, so that the spoke is not liable to rupture, and, second, the spoke and its head are let into the flange, so that the latter presents a smooth surface and is not likely to engage the clothing of a person or other objects. If preferred, however, the spoke 25 may be bent at the end and made to pierce the flange 27, as shown in Fig. 4. It will be also understood that the spokes may be placed tangentially on the flanges 27, if preferred, without affecting the principle of the invention.

The wheel is provided with a felly 28, which may be of wood or any suitable material, and is convex on the inner side to fit the concave metal (preferably steel) rim 35, presently referred to. Each spoke is fastened to the felly by means of a sleeve or nipple 29 and its connections, the outer end of the spoke being threaded externally and the sleeve or nipple being threaded internally to screw to the spoke. Each sleeve 29 has a head 30, which is let into the outer part of the felly, lying in a recess 32 thereof and engaging a washer 31, which forms a bearing for the head. Near the inner end the sleeve 29 is threaded, as shown at 33, to receive a nut 34, which is adapted to abut with the inner rim 35, which fits the inner edge of the felly 28, and so when the nut 34 is tightened the felly is clamped securely between the washer 31 and rim 35, and as this clamped effect is obtained wherever there is a spoke it will be seen that the felly and spokes will be very securely held together and that the parts may always be held tight by simply tightening the nut referred to. The inner end of each sleeve or nipple 29 is also squared, as shown, so that after the nut 34 is loosened the wrench is applied to the nipple, so as to turn the latter. In this way a spoke may be tightened or it may be removed.

By countersinking the felly, as illustrated, the felly presents a smooth outer surface, so that the rim 36 may be conveniently fastened to it. This rim may be of any approved kind; but, as illustrated, it is dishing, so as to have a good grip on the tire 37. This tire, as shown, is solid; but obviously it may be a cushion or pneumatic tire, if preferred. In fact, it will be clearly seen that any ordinary rims and tires can be applied to the felly in any approved manner without affecting the principle of the invention.

From the foregoing description it will be clearly seen that the wheel is of the greatest simplicity, that it can be conveniently applied to an ordinary axle or to a special axle, and that it is strong, that it is adjustable, and that it well serves the purpose of an ordinary vehicle-wheel. It will also be seen that if repairs are necessary it is a very simple matter to remove a spoke by simply loosening the nut 34 and removing the head of the spoke from the flanges 27 and unscrewing by simply turning the appropriate sleeve or nipple 29, as already described.

The structure described makes a wheel unlikely to shrink, as the only wooden part—to wit, the felly—is securely clamped between the nipple-heads 30 and the inner rim 35; but in case of shrinkage the parts may be conveniently tightened, as set forth.

Having thus described our invention, we claim as new and desire to secure by Letters Patent—

1. As an improved article of manufacture, a vehicle-wheel comprising a felly countersunk on the outer side opposite the wheel-spokes, thus forming a series of sockets, a metallic rim fitting against the inner side of the felly, nipples piercing the felly and rim with their heads resting in the sockets, nuts for the nipples by which the felly is clamped between the nipple-heads and the rim, a hub, and spokes extending from the hub to the nipples.

2. In a vehicle-wheel, the combination of the felly countersunk on the outer side to form a series of sockets, a relatively thin rim fitting the inner side of the felly, spoke-nipples extending through the felly and rim with heads resting in the sockets, the inner ends of the nipples being screw-threaded, and nuts for the nipples by which the felly can be clamped between the nipple-heads and rim.

3. As an improved article of manufacture, a vehicle-wheel comprising oppositely-arranged bearing-cones and cups, one cone being shaped to slide on an axle, and the other being screw-threaded, a hub having enlarged ends to fit the cups and a pair of external flanges, a series of spokes removably secured to the flanges, a felly countersunk on the outer side, a rim on the inner side of the felly, nipples piercing the felly and rim and lying in the countersunk parts of the felly, and means for securing the spokes to the nipples, substantially as described.

In testimony whereof we have signed our names to this specification in the presence of the subscribing witnesses.

HOWARD KINNEY.
JOHN O. HANKINS.

Witnesses to the signature of Howard Kinney:
JOHN H. JACOBUS,
CHAS. HOFFMAN.

Witnesses to the signature of John O. Hankins:
W. A. CRENSHAW,
A. L. RICHARDSON.